United States Patent
Nijim

(10) Patent No.: US 8,789,117 B2
(45) Date of Patent: Jul. 22, 2014

(54) CONTENT LIBRARY

(75) Inventor: Yousef Wasef Nijim, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 206 days.

(21) Appl. No.: 12/868,801

(22) Filed: Aug. 26, 2010

(65) Prior Publication Data

US 2012/0054810 A1  Mar. 1, 2012

(51) Int. Cl.
- *H04N 7/173* (2011.01)
- *H04N 21/278* (2011.01)
- *H04N 21/258* (2011.01)
- *H04N 21/472* (2011.01)

(52) U.S. Cl.
CPC ........... *H04N 21/278* (2013.01); *H04N 21/258* (2013.01); *H04N 21/47202* (2013.01); *H04N 21/472* (2013.01)
USPC .................................. 725/87; 725/53; 725/61

(58) Field of Classification Search
CPC ... H04N 21/25; H04N 21/251; H04N 21/258; H04N 21/278; H04N 21/4532; H04N 21/47202; H04N 21/47214; H04N 21/472
USPC .............................. 725/87, 50, 53, 58, 61, 46
See application file for complete search history.

(56) References Cited

U.S. PATENT DOCUMENTS

| | | | |
|---|---|---|---|
| 5,565,909 A | 10/1996 | Thibadeau et al. | |
| 5,583,560 A | 12/1996 | Florin et al. | |
| 5,808,662 A | 9/1998 | Kinney et al. | |
| 5,812,123 A | 9/1998 | Rowe et al. | |
| 5,818,439 A | 10/1998 | Nagasaka et al. | |
| 5,861,906 A * | 1/1999 | Dunn et al. | 725/87 |
| 6,144,375 A | 11/2000 | Jain et al. | |
| 6,188,398 B1 | 2/2001 | Collins-Rector et al. | |
| 6,282,713 B1 | 8/2001 | Kitsukawa et al. | |
| 6,438,579 B1 | 8/2002 | Hosken | |
| 6,615,248 B1 | 9/2003 | Smith | |
| 6,754,904 B1 | 6/2004 | Cooper et al. | |
| 6,934,963 B1 | 8/2005 | Reynolds et al. | |
| 6,968,364 B1 | 11/2005 | Wong et al. | |
| 6,983,426 B1 | 1/2006 | Kobayashi et al. | |
| 7,017,173 B1 | 3/2006 | Armstrong et al. | |
| 7,080,139 B1 | 7/2006 | Briggs et al. | |
| 7,228,305 B1 | 6/2007 | Eyal et al. | |
| 7,246,367 B2 | 7/2007 | Livonen | |
| 7,249,366 B1 | 7/2007 | Flavin | |

(Continued)

FOREIGN PATENT DOCUMENTS

JP  2002-218428  8/2002

OTHER PUBLICATIONS

Copending U.S. Appl. No. 12/959,731, filed Dec. 3, 2010 entitled "Providing a Media Guide Including Parental Information".

(Continued)

*Primary Examiner* — Pankaj Kumar
*Assistant Examiner* — Timothy Newlin
(74) *Attorney, Agent, or Firm* — Merchant & Gould P.C.

(57) ABSTRACT

A content library may be provided. First, a video on demand content program may be received. Then, video on demand information corresponding to the video on demand content program may be added to a video on demand information list. The video on demand information corresponding to the video on demand content program may be maintained in the video on demand information list after a rental window for the video on demand content program is over.

20 Claims, 3 Drawing Sheets

(56) References Cited

U.S. PATENT DOCUMENTS

| | | | |
|---|---|---|---|
| 7,272,844 B1* | 9/2007 | Bankers et al. | 725/78 |
| 7,290,211 B2 | 10/2007 | Goodwin et al. | |
| 7,363,644 B2 | 4/2008 | Wugofski | |
| 7,584,214 B2 | 9/2009 | Narahara et al. | |
| 7,596,761 B2 | 9/2009 | Lemay et al. | |
| 7,669,219 B2 | 2/2010 | Scott, III | |
| 7,673,315 B1 | 3/2010 | Wong et al. | |
| 7,685,204 B2 | 3/2010 | Rogers | |
| 7,698,263 B2 | 4/2010 | Pickelsimer et al. | |
| 7,716,376 B1 | 5/2010 | Price et al. | |
| 7,877,293 B2 | 1/2011 | Biebesheimer et al. | |
| 7,886,327 B2 | 2/2011 | Stevens | |
| 7,895,625 B1 | 2/2011 | Bryan et al. | |
| 7,904,924 B1 | 3/2011 | de Heer et al. | |
| 7,933,789 B2 | 4/2011 | Boland et al. | |
| 7,992,163 B1* | 8/2011 | Jerding et al. | 725/28 |
| 8,090,606 B2 | 1/2012 | Svendsen | |
| 8,091,032 B2 | 1/2012 | Fischer | |
| 8,220,021 B1 | 7/2012 | Look et al. | |
| 8,364,013 B2 | 1/2013 | Nijim | |
| 8,418,204 B2 | 4/2013 | Pickelsimer et al. | |
| 2001/0001160 A1 | 5/2001 | Shoff et al. | |
| 2001/0037367 A1 | 11/2001 | Iyer | |
| 2002/0007485 A1* | 1/2002 | Rodriguez et al. | 725/1 |
| 2002/0056123 A1 | 5/2002 | Liwerant et al. | |
| 2002/0057297 A1 | 5/2002 | Grimes et al. | |
| 2002/0069218 A1 | 6/2002 | Sull et al. | |
| 2002/0087982 A1 | 7/2002 | Stuart | |
| 2002/0120757 A1 | 8/2002 | Sutherland et al. | |
| 2002/0124252 A1 | 9/2002 | Schaefer et al. | |
| 2002/0128831 A1 | 9/2002 | Ju et al. | |
| 2002/0144273 A1 | 10/2002 | Reto | |
| 2002/0156852 A1 | 10/2002 | Hughes et al. | |
| 2002/0174430 A1 | 11/2002 | Ellis et al. | |
| 2002/0194195 A1 | 12/2002 | Fenton et al. | |
| 2002/0199188 A1* | 12/2002 | Sie et al. | 725/35 |
| 2003/0002849 A1 | 1/2003 | Lord | |
| 2003/0021582 A1 | 1/2003 | Sawada | |
| 2003/0084449 A1 | 5/2003 | Chane et al. | |
| 2003/0093790 A1 | 5/2003 | Logan et al. | |
| 2003/0093806 A1 | 5/2003 | Dureau et al. | |
| 2003/0112467 A1 | 6/2003 | McCollum et al. | |
| 2003/0115592 A1 | 6/2003 | Johnson | |
| 2003/0154477 A1 | 8/2003 | Hassell et al. | |
| 2003/0156827 A1 | 8/2003 | Janevski | |
| 2003/0177497 A1 | 9/2003 | Macrae et al. | |
| 2003/0206710 A1 | 11/2003 | Ferman et al. | |
| 2003/0208763 A1 | 11/2003 | McElhatten et al. | |
| 2003/0220100 A1 | 11/2003 | McElhatten et al. | |
| 2003/0225846 A1 | 12/2003 | Heikes et al. | |
| 2003/0229900 A1* | 12/2003 | Reisman | 725/87 |
| 2004/0034867 A1 | 2/2004 | Rashkovskiy et al. | |
| 2004/0060063 A1 | 3/2004 | Russ et al. | |
| 2004/0064835 A1 | 4/2004 | Bellwood et al. | |
| 2004/0078807 A1 | 4/2004 | Fries et al. | |
| 2004/0078814 A1 | 4/2004 | Allen | |
| 2004/0103167 A1 | 5/2004 | Grooters et al. | |
| 2004/0117786 A1 | 6/2004 | Kellerman et al. | |
| 2004/0210928 A1 | 10/2004 | Hamzy et al. | |
| 2004/0255336 A1 | 12/2004 | Logan et al. | |
| 2004/0255340 A1 | 12/2004 | Logan | |
| 2004/0268386 A1* | 12/2004 | Logan et al. | 725/34 |
| 2005/0022241 A1 | 1/2005 | Griggs | |
| 2005/0028208 A1 | 2/2005 | Ellis et al. | |
| 2005/0044565 A1 | 2/2005 | Jerding et al. | |
| 2005/0055710 A1 | 3/2005 | Aoki et al. | |
| 2005/0076363 A1 | 4/2005 | Dukes et al. | |
| 2005/0091316 A1 | 4/2005 | Ponce et al. | |
| 2005/0149880 A1 | 7/2005 | Postrel | |
| 2005/0210145 A1 | 9/2005 | Kim et al. | |
| 2005/0246739 A1* | 11/2005 | Davidson | 725/45 |
| 2005/0251820 A1 | 11/2005 | Stefanik et al. | |
| 2005/0262542 A1 | 11/2005 | DeWeese et al. | |
| 2005/0278443 A1 | 12/2005 | Winner et al. | |
| 2005/0278740 A1 | 12/2005 | Helms | |
| 2005/0278761 A1 | 12/2005 | Gonder et al. | |
| 2005/0283813 A1 | 12/2005 | Jamail et al. | |
| 2006/0005207 A1 | 1/2006 | Louch et al. | |
| 2006/0020904 A1 | 1/2006 | Aaltonen et al. | |
| 2006/0031882 A1* | 2/2006 | Swix et al. | 725/46 |
| 2006/0041927 A1 | 2/2006 | Stark et al. | |
| 2006/0059514 A1 | 3/2006 | Hsiao et al. | |
| 2006/0059526 A1 | 3/2006 | Poslinski | |
| 2006/0075019 A1 | 4/2006 | Donovan et al. | |
| 2006/0080408 A1 | 4/2006 | Istvan et al. | |
| 2006/0090183 A1 | 4/2006 | Zito et al. | |
| 2006/0112325 A1 | 5/2006 | Ducheneaut et al. | |
| 2006/0130093 A1 | 6/2006 | Feng et al. | |
| 2006/0143236 A1 | 6/2006 | Wu | |
| 2006/0161950 A1 | 7/2006 | Imai et al. | |
| 2006/0174277 A1 | 8/2006 | Sezan et al. | |
| 2006/0184972 A1 | 8/2006 | Rafey et al. | |
| 2006/0190966 A1 | 8/2006 | McKissick et al. | |
| 2006/0195479 A1 | 8/2006 | Spiegelman et al. | |
| 2006/0248557 A1 | 11/2006 | Stark et al. | |
| 2006/0253874 A1 | 11/2006 | Stark et al. | |
| 2006/0259926 A1 | 11/2006 | Scheelke et al. | |
| 2006/0271959 A1 | 11/2006 | Jacoby et al. | |
| 2006/0282856 A1 | 12/2006 | Errico et al. | |
| 2007/0033533 A1 | 2/2007 | Sull | |
| 2007/0061835 A1 | 3/2007 | Klein et al. | |
| 2007/0106627 A1 | 5/2007 | Srivastava et al. | |
| 2007/0123353 A1 | 5/2007 | Smith | |
| 2007/0124795 A1 | 5/2007 | McKissick et al. | |
| 2007/0150918 A1 | 6/2007 | Carpenter et al. | |
| 2007/0186180 A1 | 8/2007 | Morgan | |
| 2007/0186231 A1 | 8/2007 | Haeuser et al. | |
| 2007/0186243 A1 | 8/2007 | Pettit et al. | |
| 2007/0198532 A1 | 8/2007 | Krikorian et al. | |
| 2007/0214473 A1 | 9/2007 | Barton et al. | |
| 2007/0220566 A1 | 9/2007 | Ahmad-Taylor | |
| 2007/0245367 A1 | 10/2007 | Ogawa | |
| 2007/0256103 A1 | 11/2007 | Knudson | |
| 2007/0271338 A1 | 11/2007 | Anschutz | |
| 2007/0277205 A1 | 11/2007 | Grannan | |
| 2007/0282949 A1 | 12/2007 | Fischer et al. | |
| 2007/0294726 A1 | 12/2007 | Drazin | |
| 2007/0298401 A1 | 12/2007 | Mohanty et al. | |
| 2008/0010153 A1 | 1/2008 | Pugh-O'Connor et al. | |
| 2008/0022320 A1 | 1/2008 | Ver Steeg | |
| 2008/0036917 A1 | 2/2008 | Pascarella et al. | |
| 2008/0040370 A1 | 2/2008 | Bosworth et al. | |
| 2008/0052371 A1 | 2/2008 | Partovi et al. | |
| 2008/0065758 A1 | 3/2008 | Narayanaswami | |
| 2008/0066111 A1 | 3/2008 | Ellis et al. | |
| 2008/0066114 A1 | 3/2008 | Carlson et al. | |
| 2008/0082606 A1 | 4/2008 | Gupta et al. | |
| 2008/0086456 A1 | 4/2008 | Rasanen et al. | |
| 2008/0092168 A1 | 4/2008 | Logan et al. | |
| 2008/0098323 A1 | 4/2008 | Vallone et al. | |
| 2008/0114861 A1 | 5/2008 | Gildred | |
| 2008/0126936 A1 | 5/2008 | Williams | |
| 2008/0155600 A1 | 6/2008 | Klappert et al. | |
| 2008/0163307 A1* | 7/2008 | Coburn et al. | 725/61 |
| 2008/0168506 A1 | 7/2008 | Pickelsimer | |
| 2008/0168515 A1 | 7/2008 | Benson et al. | |
| 2008/0177727 A1 | 7/2008 | Pickelsimer | |
| 2008/0178218 A1 | 7/2008 | Pickelsimer | |
| 2008/0235733 A1 | 9/2008 | Heie et al. | |
| 2008/0247730 A1 | 10/2008 | Barton et al. | |
| 2008/0263595 A1 | 10/2008 | Sumiyoshi et al. | |
| 2008/0276278 A1 | 11/2008 | Krieger et al. | |
| 2008/0288596 A1 | 11/2008 | Smith et al. | |
| 2008/0313541 A1 | 12/2008 | Shafton et al. | |
| 2008/0320139 A1 | 12/2008 | Fukuda et al. | |
| 2009/0019374 A1 | 1/2009 | Logan et al. | |
| 2009/0049098 A1 | 2/2009 | Pickelsimer et al. | |
| 2009/0049118 A1 | 2/2009 | Stevens | |
| 2009/0049473 A1 | 2/2009 | Pickelsimer et al. | |
| 2009/0055743 A1 | 2/2009 | Pickelsimer et al. | |
| 2009/0055868 A1 | 2/2009 | Wehmeyer et al. | |
| 2009/0063994 A1 | 3/2009 | Pickelsimer et al. | |
| 2009/0094643 A1 | 4/2009 | Pickelsimer et al. | |
| 2009/0100469 A1 | 4/2009 | Conradt et al. | |

(56) References Cited

U.S. PATENT DOCUMENTS

| | | | |
|---|---|---|---|
| 2009/0125843 | A1 | 5/2009 | Billmaier et al. |
| 2009/0172127 | A1 | 7/2009 | Srikanth et al. |
| 2009/0172543 | A1 | 7/2009 | Cronin et al. |
| 2009/0178081 | A1 | 7/2009 | Goldenberg et al. |
| 2009/0199242 | A1* | 8/2009 | Johnson et al. ............ 725/46 |
| 2009/0307719 | A1 | 12/2009 | Clark et al. |
| 2009/0310933 | A1 | 12/2009 | Lee |
| 2009/0313664 | A1 | 12/2009 | Patil et al. |
| 2010/0042746 | A1 | 2/2010 | Keum et al. |
| 2010/0064320 | A1 | 3/2010 | Angiolillo et al. |
| 2010/0107194 | A1 | 4/2010 | McKissick et al. |
| 2010/0175084 | A1 | 7/2010 | Ellis et al. |
| 2010/0192173 | A1 | 7/2010 | Mizuki et al. |
| 2011/0010744 | A1 | 1/2011 | Stecyk et al. |
| 2011/0013885 | A1 | 1/2011 | Wong et al. |
| 2011/0072455 | A1 | 3/2011 | Pickelsimer et al. |
| 2011/0090402 | A1 | 4/2011 | Huntington et al. |
| 2011/0107389 | A1* | 5/2011 | Chakarapani ............ 725/132 |
| 2011/0131600 | A1 | 6/2011 | Howcroft et al. |
| 2011/0138423 | A1 | 6/2011 | Pickelsimer et al. |
| 2011/0202945 | A1 | 8/2011 | Pickelsimer et al. |
| 2011/0283313 | A1 | 11/2011 | Gathen et al. |
| 2012/0051717 | A1 | 3/2012 | Nijim |
| 2012/0054808 | A1 | 3/2012 | Nijim |
| 2012/0222056 | A1 | 8/2012 | Donoghue et al. |
| 2012/0284744 | A1 | 11/2012 | Kumar |
| 2013/0167168 | A1 | 6/2013 | Ellis et al. |

OTHER PUBLICATIONS

Copending U.S. Appl. No. 12/959,665, filed Dec. 3, 2010 entitled "Content Recommendations".
Copending U.S. Appl. No. 12/959,793, filed Dec. 3, 2010 entitled "Personalizing TV Content".
U.S. Final Office Action dated Jan. 14, 2011 cited in U.S. Appl. No. 12/126,096.
U.S. Office Action dated Jun. 7, 2011 cited in U.S. Appl. No. 11/651,140.
U.S. Final Office Action dated Jun. 13, 2011 cited in U.S. Appl. No. 12/126,060.
U.S. Final Office Action dated Jun. 21, 2011 cited in U.S. Appl. No. 12/126,025.
U.S. Office Action dated Dec. 28, 2011 cited in U.S. Appl. No. 12/545,099, 13 pgs.
U.S. Office Action dated Jan. 5, 2012 cited in U.S. Appl. No. 12/126,096, 20 pgs.
Copending U.S. Appl. No. 12/868,824, filed Aug. 26, 2010 entitled "Playlist Bookmarking".
Copending U.S. Appl. No. 12/868,838, filed Aug. 26, 2010 entitled "Content Bookmarking".
J. Bouwen et al., "Community Meets Entertainment: Community Television," Technology White Paper, Alcatel Telecommunications Review, 1st Quarter 2005, pp. 1-8, http://www.alcatel.com/doctypes/articlespaperlibrary/pdf/ATR2005QI/T0503-Community_TV-EN.pdf.
U.S. Office Action dated Apr. 28, 2009 cited in U.S. Appl. No. 11/787,733.
U.S. Office Action dated Jun. 22, 2009 cited in U.S. Appl. No. 11/787,732.
U.S. Final Office Action dated Dec. 30, 2009 cited in U.S. Appl. No. 11/787,732.
U.S. Office Action dated Sep. 14, 2010 cited in U.S. Appl. No. 11/651,140.
U.S. Office Action dated Sep. 14, 2010 cited in U.S. Appl. No. 11/787,732.
U.S. Final Office Action dated Apr. 20, 2012 cited in U.S. Appl. No. 12/126,096, 25 pgs.
U.S. Final Office Action dated Apr. 25, 2012 cited in U.S. Appl. No. 12/545,099, 16 pgs.
U.S. Final Office Action dated Apr. 25, 2012 cited in U.S. Appl. No. 11/651,140, 21 pgs.
U.S. Office Action dated May 21, 2012 cited in U.S. Appl. No. 12/868,838, 22 pgs.
U.S. Final Office Action dated Aug. 5, 2011 cited in U.S. Appl. No. 12/545,099.
U.S. Final Office Action dated Sep. 27, 2011 cited in U.S. Appl. No. 11/651,140.
U.S. Appl. No. 13/221,151, filed Aug. 30, 2011 entitled "Sharing Digitally Recorded Content".
U.S. Final Office Action dated Sep. 29, 2011 cited in U.S. Appl. No. 12/126,096.
U.S. Office Action dated Sep. 30, 2010 cited in U.S. Appl. No. 12/126,165.
U.S. Office Action dated Oct. 5, 2010 cited in U.S. Appl. No. 12/126,096.
U.S. Final Office Action dated Dec. 22, 2010 cited in U.S. Appl. No. 11/651,140.
U.S. Office Action dated Feb. 14, 2011 cited in U.S. Appl. No. 12/126,025.
U.S. Office Action dated Feb. 17, 2011 cited in U.S. Appl. No. 12/126,060.
U.S. Office Action dated Feb. 18, 2011 cited in U.S. Appl. No. 12/545,099.
U.S. Office Action dated Feb. 28, 2011 cited in U.S. Appl. No. 11/651,140.
U.S. Final Office Action dated Mar. 2, 2011 cited in U.S. Appl. No. 11/787,732.
U.S. Final Office Action dated Mar. 2, 2011 cited in U.S. Appl. No. 12/126,165.
U.S. Office Action dated Apr. 26, 2011 cited in U.S. Appl. No. 12/126,096.
U.S. Final Office Action dated May 31, 2012 cited in U.S. Appl. No. 12/126,165, 23 pgs.
U.S. Office Action dated Jun. 5, 2012 cited in U.S. Appl. No. 12/126,126, 40 pgs.
U.S. Office Action dated Jun. 20, 2012 cited in U.S. Appl. No. 12/959,731, 30 pgs.
U.S. Final Office Action dated Aug. 15, 2012 cited in U.S. Appl. No. 12/126,025, 33 pgs.
U.S. Final Office Action dated Aug. 23, 2012 cited in U.S. Appl. 12/126,060, 30 pgs.
U.S. Final Office Action dated Aug. 29, 2012 cited in U.S. Appl. No. 12/868,838, 7 pgs.
U.S. Office Action dated Mar. 26, 2012 cited in U.S. Appl. No. 12/126,060, 26 pgs.
U.S. Office Action dated Jan. 18, 2012 cited in U.S. Appl. No. 12/126,025, 27 pgs.
U.S. Office Action dated Jan. 19, 2012 cited in U.S. Appl. No. 12/126,165, 20 pgs.
U.S. Office Action dated Jan. 19, 2012 cited in U.S. Appl. No. 11/651,140, 21 pgs.
U.S. Office Action dated Dec. 19, 2012 cited in U.S. Appl. No. 12/126,025, 30 pgs.
U.S. Final Office Action dated Dec. 28, 2012 cited in U.S. Appl. No. 12/126,126, 24 pgs.
U.S. Office Action dated Sep. 13, 2012 cited in U.S. Appl. No. 11/651,140, 23 pgs.
U.S. Office Action dated Oct. 5, 2012 cited in U.S. Appl. No. 12/959,793, 31 pgs.
U.S. Office Action dated Oct. 9, 2012 cited in U.S. Appl. No. 12/545,099, 21 pgs.
U.S. Final Office Action dated Oct. 9, 2012 cited in U.S. Appl. No. 12/959,731, 19 pgs.
U.S. Office Action dated Oct. 24, 2012 cited in U.S. Appl. No. 12/126,165, 25 pgs.
U.S. Office Action dated Nov. 5, 2012 cited in U.S. Appl. No. 12/126,096, 23 pgs.
U.S. Office Action dated Nov. 20, 2012 cited in U.S. Appl. No. 13/221,151, 29 pgs.
U.S. Office Action dated Nov. 29, 2012 cited in U.S. Appl. No. 12/868,824, 33 pgs.
U.S. Final Office Action dated Feb. 26, 2013 cited in U.S. Appl. No. 11/651,140, 21 pgs.

(56) References Cited

OTHER PUBLICATIONS

U.S. Final Office Action dated Mar. 1, 2013 cited in U.S. Appl. No. 13/221,151, 15 pgs.
U.S. Final Office Action dated Mar. 27, 2013 cited in U.S. Appl. No. 12/126,096, 25 pgs.
U.S. Office Action dated Apr. 3, 2013 cited in U.S. Appl. No. 12/959,665, 45 pgs.
U.S. Final Office Action dated Apr. 10, 2013 cited in U.S. Appl. No. 12/959,793, 23 pgs.
U.S. Office Action dated Apr. 11, 2013 cited in U.S. Appl. No. 12/959,731, 22 pgs.
U.S. Final Office Action dated Apr. 11, 2013 cited in U.S. Appl. No. 12/126,025, 28 pgs.
U.S. Final Office Action dated Apr. 25, 2013 cited in U.S. Appl. No. 12/126,165, 26 pgs.
U.S. Final Office Action dated May 3, 2013 cited in U.S. Appl. No. 12/545,099, 20 pgs.
U.S. Office Action dated May 14, 2013 cited in U.S. Appl. No. 12/868,824, 12 pgs.
U.S. Office Action dated May 22, 2013 cited in U.S. Appl. No. 11/651,140, 20 pgs.
U.S. Office Action dated Jun. 20, 2013 cited in U.S. Appl. No. 12/126,126, 27 pgs.
U.S. Final Office Action dated Dec. 24, 2013 cited in U.S. Appl. No. 13/221,151, 17 pgs.
U.S. Final Office Action dated Jan. 9, 2014 cited in U.S. Appl. No. 12/126,096, 26 pgs.
U.S. Final Office Action dated Aug. 1, 2013 cited in U.S. Appl. No. 12/959,731, 23 pgs.
U.S. Final Office Action dated Aug. 14, 2013 cited in U.S. Appl. No. 12/959,665, 30 pgs.
U.S. Office Action dated Aug. 21, 2013 cited in U.S. Appl. No. 12/126,096, 23 pgs.
U.S. Office Action dated Sep. 9, 2013 cited in U.S. Appl. No. 13/221,151, 16 pgs.
U.S. Office Action dated Oct. 4, 2013 cited in U.S. Appl. No. 12/126,165, 28 pgs.
U.S. Office Action dated Oct. 7, 2013 cited in U.S. Appl. No. 12/959,793, 27 pgs.
U.S. Final Office Action dated Oct. 10, 2013 cited in U.S. Appl. No. 12/126,126, 23 pgs.
U.S. Final Office Action dated Oct. 28, 2013 cited in U.S. Appl. No. 11/651,140, 19 pgs.
U.S. Office Action dated Oct. 29, 2013 cited in U.S. Appl. No. 12/126,060, 27 pgs.
U.S. Final Office Action dated Nov. 1, 2013 cited in U.S. Appl. No. 12/868,824, 15 pgs.
U.S. Office Action dated Mar. 6, 2014 cited in U.S. Appl. No. 12/959,731, 16 pgs.
U.S. Office Action dated Mar. 18, 2014 cited in U.S. Appl. No. 11/651,140, 18 pgs.
U.S. Office Action dated Mar. 21, 2014 cited in U.S. Appl. No. 12/868,824, 12 pgs.
U.S. Final Office Action dated Apr. 3, 2014 cited in U.S. Appl. No. 12/126,060, 18 pgs.
U.S. Office Action dated May 20, 2014 cited in U.S. Appl. No. 12/126,096, 19 pgs.
U.S. Office Action dated May 21, 2014 cited in U.S. Appl. No. 13/221,151, 18 pgs.

* cited by examiner

CONTENT LIBRARY

BACKGROUND

Video on Demand (VOD) is a system that allows users to select and watch video content on demand. Television VOD systems stream content to allow viewing of the content in real time or downloading of the content to a device such as a computer, digital video recorder (DVR), or portable media player for viewing at any time. Many service providers offer both VOD streaming, including pay-per-view, and free content. With VOD, a user selects a movie or television program. Then the movie or television program begins to play on a television set almost instantaneously or begins downloading for future viewing.

SUMMARY

A content library may be provided. First, a video on demand content program may be received. Then, video on demand information corresponding to the video on demand content program may be added to a video on demand information list. The video on demand information corresponding to the video on demand content program may be maintained in the video on demand information list after a rental window for the video on demand content program is over.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
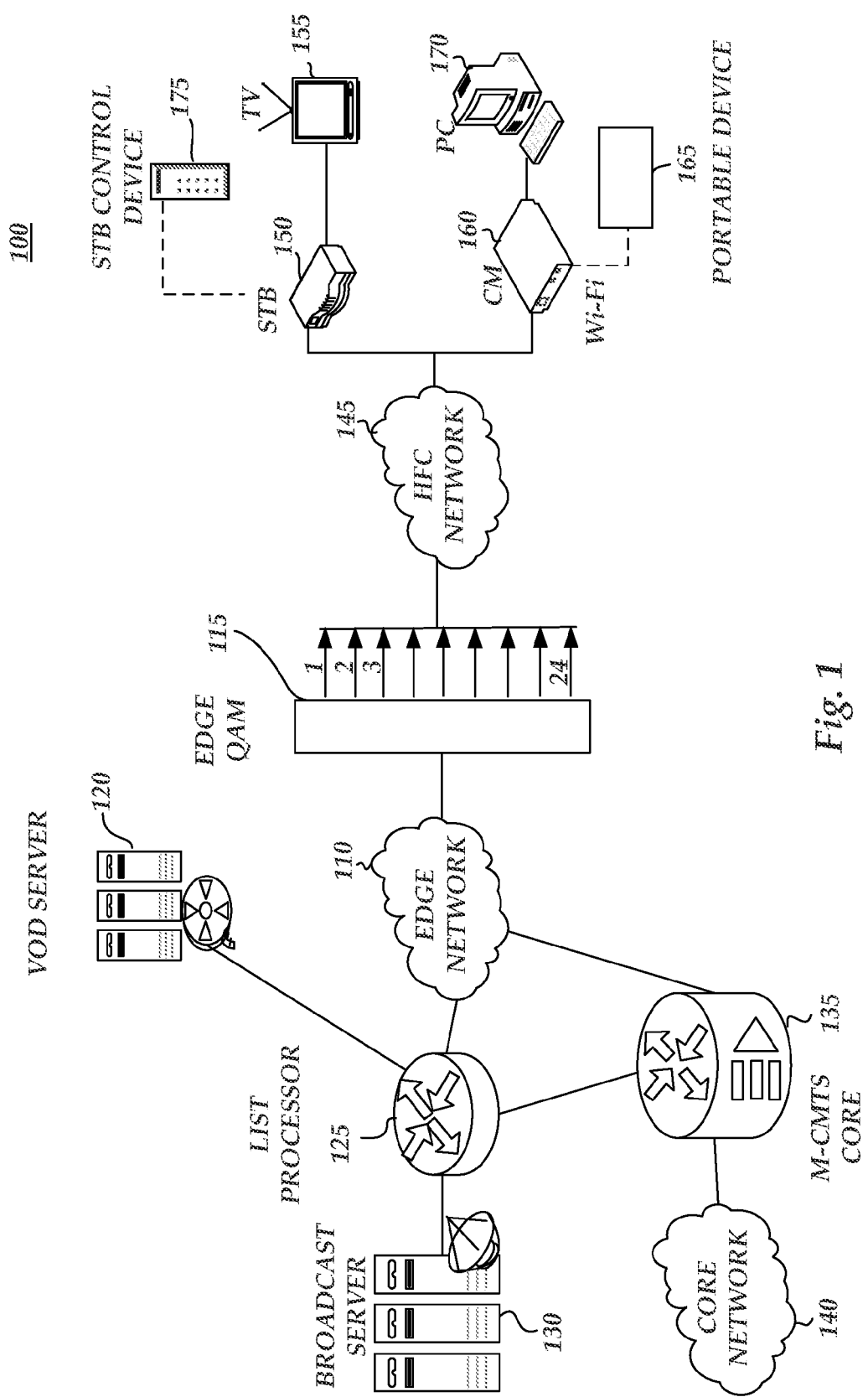
FIG. 1 is a block diagram of an operating environment including a list processor.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content programs to users (e.g. customers) over a content delivery system. The content programs may be delivered over a plurality of content channels (e.g. linear TV) or via video on demand (VOD) that the user may select among using a set-top box (STB), for example. Keeping tract of what content programs the user has already watched may be difficult especially when it comes to VOD. With conventional systems, the user is able to keep VOD content programs that were purchased during a rental window (e.g. a rental time period.) The VOD content programs, however, are pushed out on first in first out basis in conventional systems when the rental window is over.

Consistent with embodiments of the invention, the user may be able to maintain VOD information (e.g. content program titles) on VOD content programs either purchased or viewed. This VOD information may be kept in a folder that may be tracked and edited from, for example, a web portal or a mobile device. Moreover, this VOD information may be viewed on a STB. The VOD information may be maintained in a list (e.g. called "my library") containing, for example, all VOD content programs fully viewed by the user. Furthermore, the user may generate two sub-lists, one for movies and programs, and another one for music videos, for example. Embodiments of the invention may be applied to linear television content and are not limited to VOD content.

The VOD information list may contain, for example, the title of content programs along with extended information about each content program in the list. In other words, metadata for each content program may be tagged with the program and the user may be able to view all the applicable metadata (e.g. title, ratings, year, cast, crew, etc.). The VOD information list may also contain posters of the content programs when available. If a poster is not available, embodiments of the invention may leave a blank or put the title of the program where the poster would have been displayed if available. Similarly, the VOD information list may also contain trailer of the content programs when available. If a trailer is not available, embodiments of the invention may leave a blank or put the title of the program where the poster would have been displayed if available.

The VOD information list may be maintained in such a way that it may be accessible by a number of platforms such as a STB, a mobile device (e.g. a smart phone), or a computer. The VOD information list may be synchronized and updated across, for example, the three platforms (e.g. a STB, a mobile device, or a computer.) In other words, the VOD information list may be maintained in a database accessible over the internet, for example, where it may be viewed, edited, updated, and synchronized over the internet by a STB, a mobile device, or a computer. This may allow the user to keep track of all their programs that they like to review or watch when available again no matter which platform is used.

While the VOD information list may be maintained in such a way that they do not expire, consistent with embodiments of the invention, the user may able to remove programs from the VOD information list manually. Moreover, the user may purchase the content programs listed in the VOD information list if available or request to view them again when they are available via VOD or via linear TV on one of the plurality of content channels provided by the content delivery system. In addition, the user may be able to sort the VOD information list based on different options such as, but not limited to, release date, alphabetical title, actor, genre, rating, and category (e.g. series, movie, etc.). Also, the user may be able to add to the VOD information list, a content program once the content program is available in response to the user receiving a notice that the content program has became available for purchase or viewing.

In addition, the user may be a customer of an operator of the content delivery system. The customer may purchase from the operator of the content delivery system an exported file corresponding to the VOD information list. For example, the customer may wish to leave the content delivery system maintained by the system operator, but may also wish to keep the data in the VOD information list. Consequently, the operator of the content delivery system may sell or export to the user, for example, a version of the VOD information list in a popular spreadsheet software (e.g. Excel) format. The version of the VOD information list may be sold or exported in any format including extended markup language (XML) and is not limited to XML or Excel.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a list processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. List processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, list processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, mobile telephone, mobile device, notebook computer, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for providing a content library. The system may comprise a memory storage and a processing unit coupled to the memory storage. The processing unit may be operative to receive a video on demand content program and to add video on demand information corresponding to the video on demand content program to a video on demand information list. In addition, the processing unit may be operative to maintain the video on demand information corresponding to the video on demand content program in the video on demand information list after a rental window for the demand content program is over.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with STB 150, TV 155, CM 160, PC 170, portable device 165, or list processor 125, in combination with system 100. The aforementioned system and processors are examples and other systems and processors may comprise the aforementioned memory, processing unit, or other components, consistent with embodiments of the present invention.

Figure 2:
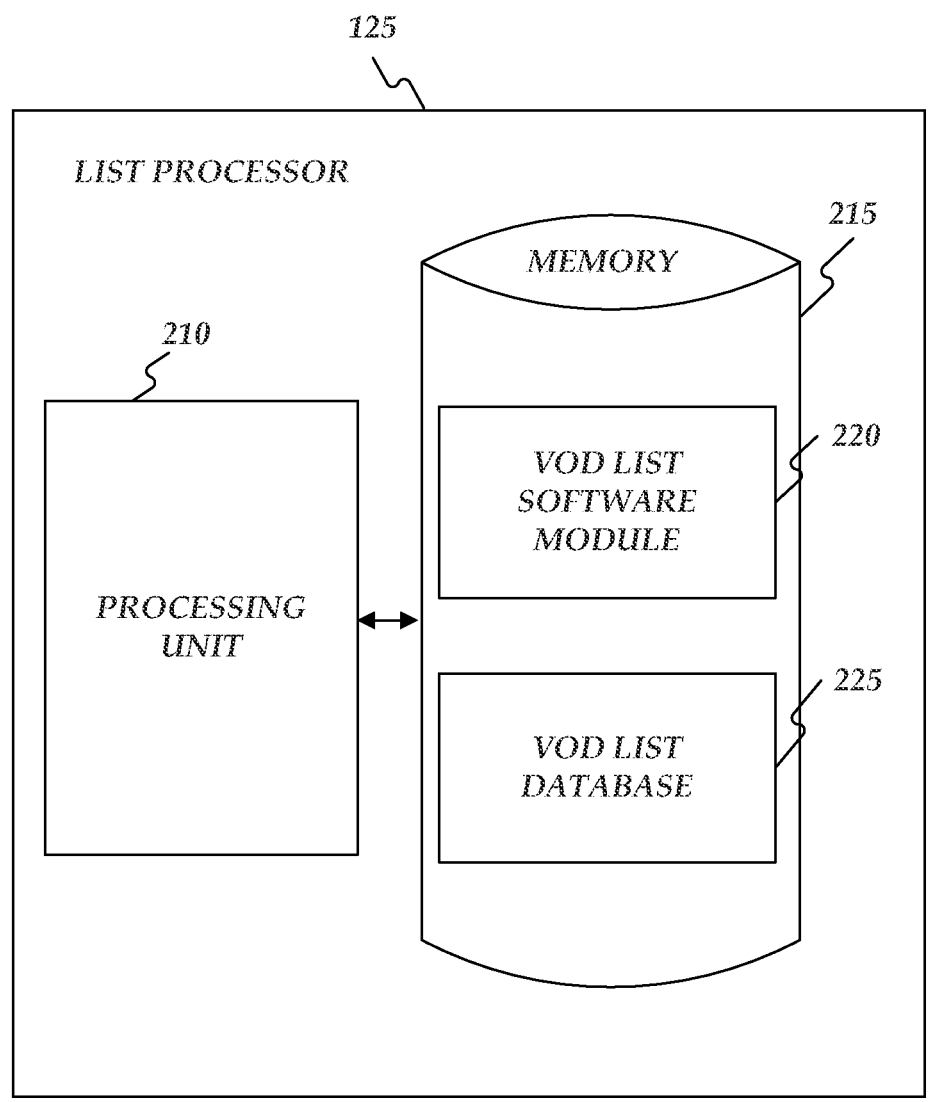
FIG. 2 is a block diagram of the list processor.

FIG. 2 shows list processor 125 of FIG. 1 in more detail. As shown in FIG. 2, list processor 125 may include a processing unit 210 and a memory unit 215. Memory 215 may include a VOD list software module 220 and a VOD list database 225. While executing on processing unit 210, VOD list software module 220 may perform processes for providing a video on demand library, in conjunction with, for example, one or more stages included in method 300 described below with respect to FIG. 3. Furthermore, VOD list software module 220 and VOD list database 225 may be executed on or reside in any element shown in FIG. 1. Moreover, any one or more of the stages included in method 300 may be performed on any element shown in FIG. 1 including, but not limited to, STB 150, TV 155, CM 160, PC 170, or portable device 165.

List processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
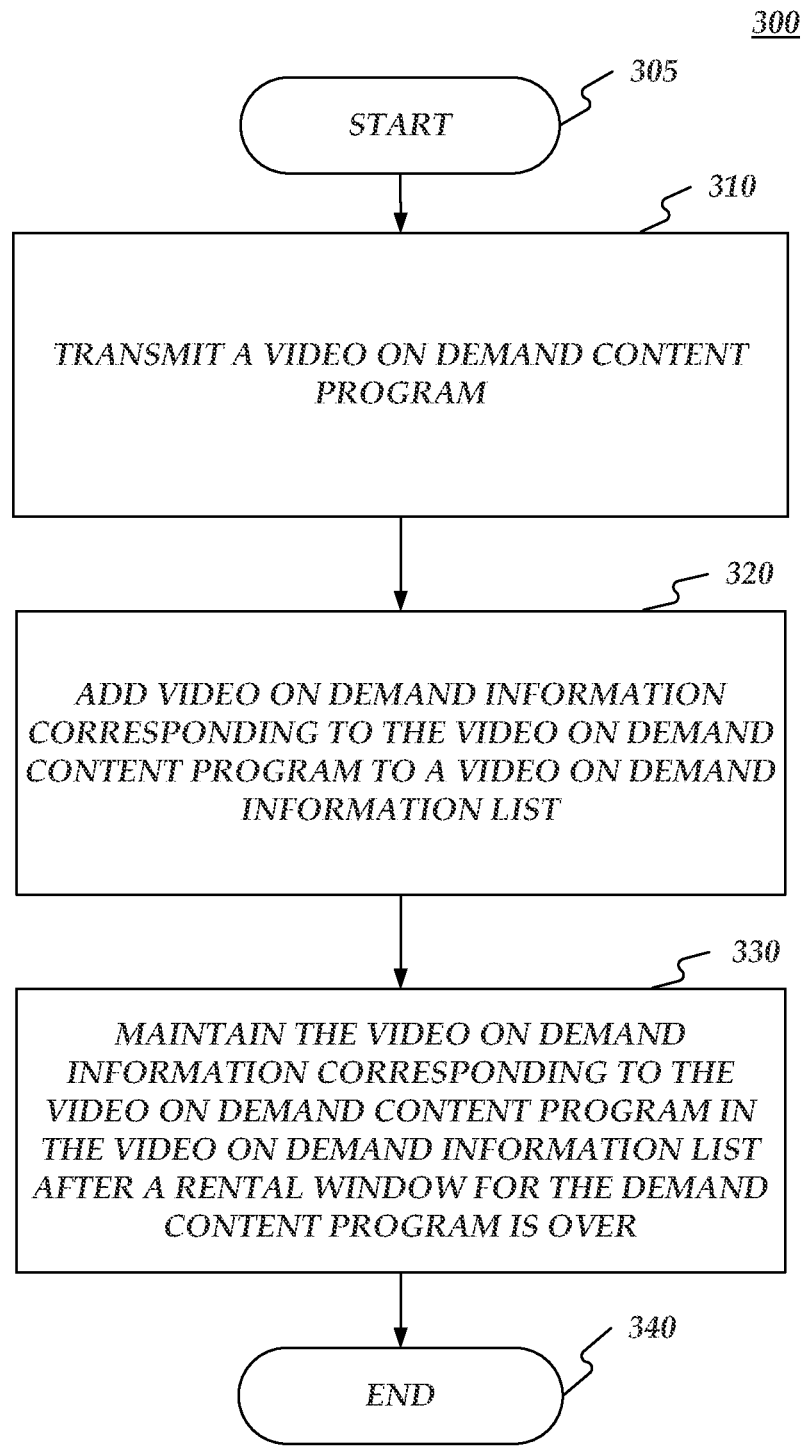
FIG. 3 is a flow chart of a method for providing a video on demand library.

FIG. 3 is a flow chart setting forth the general stages involved in a method 300 consistent with an embodiment of the invention for providing a video on demand library. Method 300 may be implemented using, for example, a STB 150 as described in more detail above with respect to FIG. 1. Embodiments of the invention may be implemented using devices other than and in addition to STB 150 including, but not limited to, CM 160, portable device 165, PC 170, list processor 125, or VOD server 120, for example. Ways to implement the stages of method 300 will be described in greater detail below.

Method 300 may begin at starting block 305 and proceed to stage 310 where STB 150 may receive a video on demand content program. For example, from STB 150, TV 155, CM 160, PC 170, or portable device 165, a user may initiate an order to rent the video on demand content program from an operator of system 100. In response, the system operator may either stream or down load the video on demand content program from VOD server 120. Consequently, the user may receive the video on demand content program at STB 150 where it may be saved for the rental period or displayed on TV 155. The video on demand content program may be saved for the rental period or displayed on PC 170 or portable device 165.

From stage 310, where STB 150 receives the video on demand content program, method 300 may advance to stage 320 where list processor 125 may add video on demand information corresponding to the video on demand content program to a video on demand information list. For example, list processor 125 may maintain the video on demand information list in VOD database 225. The video on demand information corresponding to the video on demand content program may be added to the video on demand information list after the video on demand content program has been fully viewed by the user on one of TV 155, PC 170, or portable device 165, for example. Furthermore, the video on demand information corresponding to the video on demand content program may be added to the video on demand information list after the video on demand content program has been rented by the user and down loaded to one of STB 150, PC 170, or portable device 165, for example.

Consistent with embodiments of the invention, the video on demand information list may comprise two sub-lists. One of the sub-lists may comprise a first sub-list for movies and programs and a second sub-list may be for music videos. The video on demand information may comprise, but is not limited to, a title of the video on demand content program, a rating of the video on demand content program, a year the video on demand content program was released, a cast of the video on demand content program, and a crew of the video on demand content program. The video on demand information may also comprise a poster corresponding to the video on demand content program when available.

Once list processor 125 adds the video on demand information corresponding to the video on demand content program to the video on demand information list in stage 320, method 300 may continue to stage 330 where list processor 125 may maintain the video on demand information corresponding to the video on demand content program in the video on demand information list after a rental window for the demand content program is over. Consistent with embodiments of the invention, the user may be able to maintain the video on demand information (e.g. content program titles) on the video on demand content programs either purchased or viewed. For example, the video on demand information may be maintained in VOD list database 225 almost indefinitely and well after a rental window (e.g. a rental time period) of the video on demand content program. Once list processor 125 maintains the video on demand information in stage 330, method 300 may then end at stage 340.

Consistent with embodiments of the invention, the video on demand information may be kept in a folder in VOD list database 225 that may be tracked and edited from, for example, a STB, a web portal, or a mobile device. For example, the video on demand information may be tracked and edited from STB 150, PC 170, or portable device 165. A user initiated input corresponding to the video on demand content program may be received at list processor 125 from any of STB 150, PC 170, or portable device 165.

In response to the received user initiated input, the video on demand information corresponding to the video on demand content program may be received from the video on demand information list in VOD list database 225. Consequently, STB 150, PC 170, or portable device 165 may display the retrieved video on demand information. The retrieved video on demand information may be edited or deleted on VOD list database 225 by STB 150, PC 170, or portable device 165. Any local copies of the video on demand information list on STB 150, PC 170, or portable device 165 may be updated and synchronized when the video on demand information list is edited in VOD list database 225.

VOD content may come and go from rental availability. Consistent with embodiments of the invention, the operator of system 100 may monitor the video on demand information list. When the video on demand content program is again available from VOD server 120, the operator of system 100 may offer to rent the video on demand content program again to the user. Similarly, the operator of system 100 may offer to sell the video on demand content program when it becomes available for sell.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:
1. A method for providing a content library, the method comprising:
 transmitting a video on demand content program;
 adding video on demand information corresponding to the video on demand content program to a video on demand information list;

maintaining the video on demand information corresponding to the video on demand content program in the video on demand information list after a rental window for the demand content program is over;

receiving a user initiated input corresponding to the video on demand content program;

retrieving, in response to the received user initiated input, the video on demand information corresponding to the video on demand content program from the video on demand information list; and displaying the retrieved video on demand information, wherein displaying the retrieved video on demand information comprises;

determining that the video on demand information does not comprise a poster corresponding to the video on demand content program, and displaying a title of the video on demand content program in a place where the poster corresponding to the video on demand content program would have been displayed if the video on demand information had included the poster corresponding to the video on demand content program.

2. The method of claim 1, wherein adding the video on demand information corresponding to the video on demand content program to the video on demand information list comprises adding the video on demand information corresponding to the video on demand content program to the video on demand information list after the video on demand content program has been fully viewed.

3. The method of claim 1, wherein adding the video on demand information corresponding to the video on demand content program to the video on demand information list comprises adding the video on demand information corresponding to the video on demand content program to the video on demand information list after the video on demand content program has been rented.

4. The method of claim 1, wherein adding the video on demand information corresponding to the video on demand content program to the video on demand information list comprises adding the video on demand information corresponding to the video on demand content program to the video on demand information list comprising two sub-lists comprising a first sub-list for movies and programs and a second sub-list for music videos.

5. The method of claim 1, wherein adding the video on demand information comprises adding the video on demand information comprising at least one of the following: a title of the video on demand content program, a rating of the video on demand content program, a year the video on demand content program was released, a cast of the video on demand content program, and a crew of the video on demand content program.

6. The method of claim 1, further comprising offering to rent the video on demand content program again when it becomes available.

7. The method of claim 1, further comprising offering the video on demand content program for purchase when it becomes available.

8. The method of claim 1, further comprising editing the video on demand information list in response to user initiated inputs received from a user device.

9. The method of claim 1, further comprising editing the video on demand information list in response to user initiated inputs received from a user from one or more of the following devices controlled by the user: a set-top box, a computer, and a mobile device.

10. The method of claim 1, further comprising sorting the video on demand information by at least one of the following: release date, alphabetical title, actor, genre, rating, and category in response to user initiated input.

11. A system for a content library, the system comprising:

a memory storage; and a processing unit coupled to the memory storage, wherein the processing unit is operative to:

transmit a video on demand content program;

add video on demand information corresponding to the video on demand content program to a video on demand information list;

maintain the video on demand information corresponding to the video on demand content program in the video on demand information list;

receive a user initiated input corresponding to the video on demand content program;

retrieve, in response to the received user initiated input, the video on demand information corresponding to the video on demand content program from the video on demand information list; and display the retrieved video on demand information, wherein the processing unit being operative to display the retrieved video on demand information comprises the processing unit being operative to;

determine that the video on demand information does not comprise a poster corresponding to the video on demand content program, and display a title of the video on demand content program in a place where the poster corresponding to the video on demand content program would have been displayed if the video on demand information had included the poster corresponding to the video on demand content program.

12. The system of claim 11, wherein the processing unit being operative to add the video on demand information corresponding to the video on demand content program to the video on demand information list comprises the processing unit being operative to add the video on demand information corresponding to the video on demand content program to the video on demand information list after the video on demand content program has been fully viewed.

13. The system of claim 11, wherein the processing unit being operative to add the video on demand information corresponding to the video on demand content program to the video on demand information list comprises the processing unit being operative to add the video on demand information corresponding to the video on demand content program to the video on demand information list after the video on demand content program has been rented.

14. The system of claim 11, wherein the processing unit being operative to add the video on demand information corresponding to the video on demand content program to the video on demand information list comprises the processing unit being operative to add the video on demand information corresponding to the video on demand content program to the video on demand information list comprising two sub-lists comprising a first sub-list for movies and programs and a second sub-list for music videos.

15. The system of claim 11, wherein the processing unit being operative to add the video on demand information comprises the processing unit being operative to add the video on demand information comprising at least one of the following: a title of the video on demand content program, a rating of the video on demand content program, a year the video on demand content program was released, a cast of the video on demand content program, and a crew of the video on demand content program.

16. The system of claim 11, further comprising the processing unit being operative to offer to rent the video on demand content program again when it becomes available.

17. The system of claim 11, further comprising the processing unit being operative to offer the video on demand content program for purchase when it becomes available.

18. The system of claim 11, further comprising the processing unit being operative to edit the video on demand information list in response to user initiated inputs received from a user device.

19. The system of claim 11, further comprising the processing unit being operative to edit the video on demand information list in response to user initiated inputs received from a user from one or more of the following devices controlled by the user: a set-top box, a computer, and a mobile device.

20. The system of claim 11, further comprising the processing unit being operative to sort the video on demand information by at least one of the following: release date, alphabetical title, actor, genre, rating, and category in response to user initiated input.

\* \* \* \* \*